United States Patent
Friesel

(10) Patent No.: US 10,094,595 B1
(45) Date of Patent: Oct. 9, 2018

(54) SOLAR HEAT COLLECTOR

(75) Inventor: Mark A. Friesel, Ewing, NJ (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 1403 days.

(21) Appl. No.: 13/468,107

(22) Filed: May 10, 2012

(51) Int. Cl.
| F24S 23/71 | (2018.01) |
| F24S 10/70 | (2018.01) |
| F24S 20/55 | (2018.01) |
| F24S 90/10 | (2018.01) |
| F24S 20/00 | (2018.01) |

(52) U.S. Cl.
CPC .............. F24S 10/70 (2018.05); F24S 20/55 (2018.05); *F24S 90/10* (2018.05); *F24S 2020/11* (2018.05)

(58) Field of Classification Search
CPC .... F24J 2/4647; F24J 2/24; F24J 2/243; F24J 2/244
See application file for complete search history.

(56) References Cited

U.S. PATENT DOCUMENTS

| 761,596 | A | * | 5/1904 | Moss | F24J 2/07 |
| | | | | | 126/646 |
| 1,575,309 | A | * | 3/1926 | Anderson | F24J 2/0488 |
| | | | | | 126/583 |
| 1,946,184 | A | * | 2/1934 | Abbot | F24J 2/055 |
| | | | | | 126/603 |
| 3,130,084 | A | * | 4/1964 | Loring | H01L 35/00 |
| | | | | | 126/680 |
| 3,643,648 | A | * | 2/1972 | Tarcici | F24J 2/02 |
| | | | | | 126/600 |
| 3,797,476 | A | * | 3/1974 | Tarcici | F24J 2/02 |
| | | | | | 126/600 |
| 3,847,136 | A | * | 11/1974 | Salvail | F24J 2/14 |
| | | | | | 126/573 |
| 3,982,527 | A | * | 9/1976 | Cheng | F24J 2/06 |
| | | | | | 126/658 |
| 3,985,119 | A | * | 10/1976 | Oakes, Jr. | F24J 2/07 |
| | | | | | 126/600 |
| 3,996,918 | A | * | 12/1976 | Quick | F24J 2/4647 |
| | | | | | 126/649 |
| 4,030,477 | A | * | 6/1977 | Smith | F24J 2/15 |
| | | | | | 126/623 |
| 4,048,982 | A | * | 9/1977 | Pei | F24J 2/05 |
| | | | | | 126/676 |
| 4,074,704 | A | * | 2/1978 | Gellert | F24J 2/062 |
| | | | | | 126/683 |
| 4,084,576 | A | * | 4/1978 | Pei | F24J 2/045 |
| | | | | | 126/657 |

(Continued)

*Primary Examiner* — Avinash Savani
*Assistant Examiner* — Martha Becton
(74) *Attorney, Agent, or Firm* — Howard IP Law Group

(57) ABSTRACT

A simple and portable solar heat collector has a sheet of solar reflectors, each of the solar reflectors having a focal point, and tubing for routing heat absorbing fluid through the focal point of at least some of the solar reflectors. The tubing has an input tube for receiving heat absorbing fluid and an output tube for outputting heated heat absorbing fluid. The sheet of solar reflectors may have a sun-facing side and a non-sun-facing side. A first part of the tubing is adjacent to the non-sun-facing side of the sheet of solar reflectors, and a second part of the tubing extends from the first part of the tubing through holes in the sheet of solar reflectors to the focal point of at least some of the solar reflectors.

18 Claims, 9 Drawing Sheets

(56) References Cited

U.S. PATENT DOCUMENTS

| | | | | |
|---|---|---|---|---|
| 4,173,213 A * | 11/1979 | Kelly | F24J 2/10 | 126/604 |
| 4,282,857 A * | 8/1981 | Pei | F24J 2/055 | 126/584 |
| 4,285,667 A * | 8/1981 | Schmidt | F24J 2/07 | 126/689 |
| 4,319,561 A * | 3/1982 | Pei | F24J 2/055 | 126/584 |
| 4,340,031 A * | 7/1982 | Niedermeyer | F24J 2/12 | 126/600 |
| 4,373,515 A * | 2/1983 | Morgan | F24J 2/07 | 126/677 |
| 4,452,233 A * | 6/1984 | Goodman, Jr. | F24J 2/055 | 126/653 |
| 4,599,995 A * | 7/1986 | Dane | F24J 2/07 | 126/573 |
| 4,608,964 A * | 9/1986 | Russo | F24J 2/125 | 126/624 |
| 4,893,612 A * | 1/1990 | Dawson | F24J 2/06 | 126/683 |
| 5,720,452 A | 2/1998 | Mutschler, Jr. | | |
| 5,940,987 A * | 8/1999 | Stummer | F26B 3/084 | 165/104.16 |
| 6,164,786 A * | 12/2000 | Lloyd | F24J 2/06 | 126/685 |
| 6,336,452 B1 * | 1/2002 | Tirey, Jr. | F24J 2/12 | 126/578 |
| 6,394,395 B1 | 5/2002 | Poturalski et al. | | |
| 8,430,093 B1 | 4/2013 | Harris | | |
| 8,960,187 B1 * | 2/2015 | Elkind | F24J 2/1057 | 126/688 |
| 9,212,829 B1 * | 12/2015 | Friesel | F24J 2/08 | |
| 2002/0185124 A1 * | 12/2002 | Blackmon, Jr. | B32B 37/144 | 126/680 |
| 2006/0124276 A1 * | 6/2006 | Curtis | F24D 11/007 | 165/48.2 |
| 2007/0227533 A1 * | 10/2007 | Butler | F24J 2/265 | 126/651 |
| 2009/0056701 A1 * | 3/2009 | Mills | H01L 31/054 | 126/606 |
| 2010/0263662 A1 * | 10/2010 | Sagliocca | F24J 2/045 | 126/653 |
| 2010/0319684 A1 * | 12/2010 | Almogy | F24D 11/003 | 126/714 |
| 2011/0168160 A1 * | 7/2011 | Martinez Moll | F24J 2/10 | 126/573 |
| 2013/0228210 A1 * | 9/2013 | Winston | F24J 2/13 | 136/246 |
| 2014/0360492 A1 * | 12/2014 | Kunczynski | F24J 2/24 | 126/714 |
| 2015/0184894 A1 * | 7/2015 | Verma | F03G 6/067 | 126/600 |

* cited by examiner

CROSS_SECTION

SOLAR HEAT COLLECTOR

FIELD OF THE INVENTION

The present invention relates to solar thermal energy, and more particularly to a panel thermal solar heat collector.

BACKGROUND OF THE INVENTION

Since the discovery of electricity, the world's use of electric devices has increased many times over. Until recently, the demand for electric has been satisfied in large part using electricity generated through the use of oil. But concerns about the limitations of the world's oil supply, as well environmental concerns, have led to a search for alternative sources to generate power.

In that regard, the use of solar power as an energy source has increased, with large solar panels becoming more common fixtures on both homes and businesses. Solar farms having thousands of panels to harness the power of the sun are also not uncommon. The use of solar power has led to the development of both photovoltaic and thermal types of solar panels. Photovoltaic type panels convert the solar energy to electricity, while thermal type panels convert the solar energy to heat. Both have been used as substitutes for oil-generated heat or electric.

Thermal type panels have been used for a variety of different purposes. Larger thermal panels are used in thermal solar power plants, with some of the huge, several-story high, parabolic thermal solar panels being able to generate temperatures up to 3,800 degrees Celsius. Medium sized solar thermal panels have been used to heat water in a home and use large rigid panels on top of the home. Even smaller solar thermal panels, which might be used to heat pools or for space heating, involve the use of large and heavy panels.

Thus, while solar power has been used on a large scale to power homes and businesses, it has not been seen as a viable power source on a small scale, and it has not been seen as a viable portable power source. This is due in large part to the perception of solar panels as large, heavy, and unwieldy devices that are difficult to install and expensive to purchase.

Thus, smaller, lighter, easier to build, and portable thermal solar panels are desired to allow a greater use of thermal solar panels and to facilitate a change in the perception of solar power as only being usable for large scale implementations. The smaller solar panels have many advantages, including the advantage of cost and maintenance effectiveness, scaling efficiency that allows cost to be linear with respect to array size and the ability of increase the size of the array incrementally, portability, the ability to repair or replace segments of large arrays at low cost with little effort.

SUMMARY OF THE INVENTION

A solar heat collector comprises a sheet of solar reflectors, each of the solar reflectors having a focal point, and tubing for routing heat absorbing fluid through the focal point of at least some of the solar reflectors. The tubing may have an input tube for receiving the heat absorbing fluid and an output tube for outputting heated heat absorbing fluid. The sheet of solar reflectors may have a sun-facing side and a non-sun-facing side, such that a first part of the tubing is adjacent to the non-sun-facing side of the sheet of solar reflectors and a second part of the tubing extends from the first part of the tubing through holes in the sheet of solar reflectors to the focal point of at least some of the solar reflectors. The holes in the sheet of solar reflectors may be centered on individual solar reflectors and the second part of the tubing may extend perpendicularly from the first part of the tubing through the holes in the solar reflectors to the focal point.

In an embodiment, the first part of the tubing of the solar heat collector is embedded within a substrate. The solar hear collector may further comprise a protective layer adjacent to a sun-facing side of the sheet of solar reflectors. In the solar heat collector, parts of the tubing may be supported by the protective layer such that portions of the tubing pass through the focal point of least some of the solar reflectors. The tubing of the solar heat collector may be primarily located on a sun-facing side of the sheet of solar reflectors and the tubing may be supported so that portions of the tubing pass through the focal point of at least some of the solar reflectors. The solar heat collector may be configured so that a section of the solar heat collector can be removed and functionality of the solar heat collector retained by patching gaps in the tubing caused by the removed section with patch tubing. The solar heat collector may also be configured so that a section of the solar heat collector can be replaced with a replacement section.

In an embodiment, a solar heat collector may comprise a reflective layer having solar reflectors, each of the solar reflectors having a focal point, and a heat absorbing layer, a portion of said heat absorbing layer being situated at the focal point of at least some of the solar reflectors. The heat absorbing layer may have an input for receiving a heat absorbing fluid, passages for routing a heat absorbing fluid through the heat absorbing layer and through the focal point of at least some of the solar reflectors, and an output for heated heat absorbing fluid. In an embodiment of the solar heat collector, a first part of the heat absorbing layer may be adjacent to a non-sun-facing side of the reflective layer and a second part of the heat absorbing layer may extend from the first part of the heat absorbing layer through holes in the reflective layer to the focal point of at least some of the solar reflectors. The input of the solar heat collector may comprise an input tube, the passages may comprise tubing, and the output may comprise an output tube. The tubing may be embedded within a substrate. In an embodiment of the solar heat collector, the holes in the solar reflectors are centered on individual solar reflectors and the second part of the heat absorbing layer extends perpendicularly from the first part of the heat absorbing layer to the focal point of at least some of the solar reflectors. The solar hear collector may further comprise a protective layer adjacent to a sun-facing side of the reflective layer. In an embodiment, a section of the solar heat collector can be removed and functionality of the solar heat collector retained by patching gaps in the heat absorbing layer caused by the removed section. In another embodiment, a section of the solar heat collector can be replaced with a replacement section.

A method for constructing a solar heat collector may comprise applying a bit array to a sheet of reflective material to create a sheet of solar reflectors, each bit in the bit array creating a solar reflector having a known focal point; and mating the sheet of solar reflectors to a heat absorbing layer such that at least a portion of the heat absorbing layer passes through a focal point of at least some of the solar reflectors. In the method for constructing the solar heat collector, each bit in the bit array also creates a hole centered in each reflector, a first part of the heat absorbing layer is adjacent to a non-sun-facing side of the sheet of reflective material, and a second part of the heat absorbing layer comprises tubing towers extending from the first part of the heat absorbing layer though the hole centered in each reflector to the focal point of at least some of the solar reflectors. Mating the sheet of solar reflectors to the heat absorbing layer may comprise inserting the tubing towers of the heat absorbing layer into the hole centered in each of the solar reflectors. In an embodiment of the method, the heat absorbing layer may comprise tubing and mating the sheet of solar reflectors to the heat absorbing layer may comprise mounting the tubing on a reflective side of the sheet of reflective material such that a portion of the tubing passes through a focal point of at least some of the solar reflectors.

DETAILED DESCRIPTION

Figure 1:
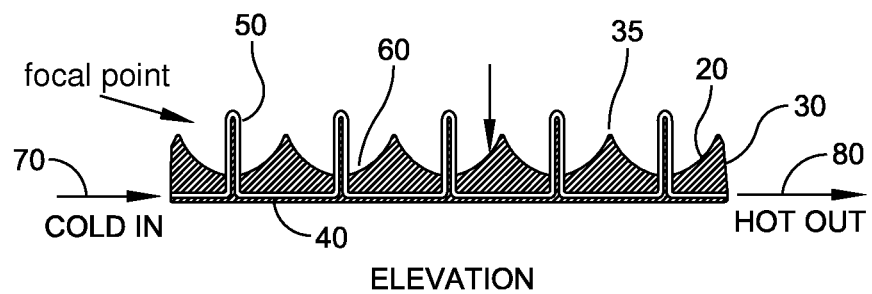
FIG. 1 is a cross-sectional elevation of a solar heat collector of an embodiment of the invention in which the heat absorbing layer is primarily below the reflective layer.

This description of the preferred embodiments is intended to be read in connection with the accompanying drawings, which are to be considered part of the entire written description of this invention. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, such as "attached," "attaching," "mounted," and "mounting" are used interchangeably and refer to one structure or surface being secured to another structure or surface, unless expressly described otherwise.

FIG. 1 shows a partial elevation of a solar heat collector 10 embodiment of the invention. The solar heat collector has a reflective layer 30 comprising a sheet of reflective material, which in an embodiment is a continuous sheet of individual solar reflectors 20 and a heat absorbing layer. The reflective layer has a side that faces the sun, the sun-facing side, and a side that does not face the sun, the non-sun-facing side. Each of the individual solar reflectors has a focal point of a known focal length, which is above the reflective side (the sun-facing side) of the reflector. The lenses used for the solar heat collector 10 may be a flat array of precision Fresnel, parabolic, circular, short focal length, or trough reflectors.

In the embodiment of FIG. 1, the reflective layer is comprised of contiguous concave reflectors that are configured such that each reflector reflects light impinging at any point along the surface of the reflector and redirects it to the focal point of the reflector. Each of the reflectors may have the same focal length, which causes all of the focal points of all of the reflectors to effectively reside in a plane over the reflective sheet. The reflective layer 30 may be made from a sheet of reflective material such as aluminum or other reflective material. Alternatively, the reflective layer may be made from a substrate that is then covered by reflecting material such as reflective mylar, reflective paint, or other reflective coating. The substrate may be rubber, foam, or other material, and it may be an insulating material that helps retain heat in the heat absorbing fluid that is used in the heat absorbing layer. In the embodiment of FIG. 1, each of the reflectors has a hole 60 in its center to allow for the heat absorbing layer to extend from the non-sun-side of the reflector to the focal point of at least some of the reflectors.

The heat absorbing layer may be made up of a first part comprising internal tubing or passages 40 transversely extending through the solar heat collector and a second part comprising towers 50 that may extend orthogonally from the internal tubing or passages 40. In the embodiment of FIG. 1, the heat absorbing layer comprises a first substantially flat section with tubing or passage sections 40 that are beneath the reflective layer (on the non-sun-facing side of the reflective layer), as well as a second section comprising towers 50 that extend vertically from the flat section of the heat absorbing layer to the focal point of at least some of the reflectors 20 on the sun-side of the reflective layer. The towers 50 may extend perpendicularly from the flat portion of the heat absorbing layer as shown in FIG. 1, or alternatively it may extend non-perpendicularly, in which case the holes in the reflectors are placed to align with the towers 50.

The towers 50 may be tubing made from rubber or plastic or any suitable material for carrying a heat absorbing fluid such as liquid or gas within the tubing, and the tubing for the towers should be of a material rigid enough to maintain the tubing upright at the focal point of the reflectors. The tubing in the towers 50 may include two fluid paths, one path to route the fluid up the tower 50 to the focal point, and then a second fluid path to route the fluid down the tower 50 to the tubing or passages 40 in the first section of the heat absorbing layer. The tubing of the heat absorbing layer may also be embedded within, or integral to, a substrate such as rubber or foam. Alternatively, the towers 50 may be made from a substrate (such as rubber or other suitable material), with passages within the substrate for the heat absorbing fluid. A solar heat collector of this embodiment may be assembled by lining up the holes or apertures 60 in the reflective layer 30 with the towers 50. It is understood that holes 60 are sized to accommodate the towers 50 extending therethrough, such that the tower and reflector form a substantially gap-free arrangement. The reflective layer and the heat absorbing layer may be attached, for example via adhesive such as glue, or fused together to prevent movement of the different layers. In an embodiment, the heat absorbing layer forms a lattice or array of small diameter tubing.

As will be understood, the solar heat collector may have different proportions between the area of the towers relative to the area of the internal tubing. The proportions chosen may depend on a variety of factors such as the materials used, the construction method used, the desired size of the solar heat collector, the diameter of the tubing, and the heat absorption capability of the fluid used in the tubing. In an embodiment, the solar heat collector is configured to provide for all heat absorption to occur at the focal points of the towers. For modeling purposes the tubing or passages may be considered perfectly insulated (and the materials and construction method used are selected to approximate perfect insulation) so they do not lose heat that is absorbed by fluid at the focal point of the towers. This embodiment may be modeled by the equation:

$$H=Nk(a-e)$$

where H=heat; k=heat per unit area of the array; N=the number of array elements; a=element area; and e=effective area per element that does not contribute heat. As will be understood, other modeling equations may be created to account for different configurations, such as solar heat collectors with less than perfect insulation or solar heat collectors that allow for a portion of the heat absorption by the fluid in the tubing or passages to occur by transfer of incidental heat of the reflectors to the tubing or passages below the reflectors.

As shown in FIG. 1, the heat absorbing layer has an input tube 70 and an output tube 80. In an embodiment, heat absorbing fluid such as liquid or gas is introduced into input tube 70. The heat absorbing fluid flows through tubes or passages 40 and towers 50. In the towers 50, the fluid is exposed to concentrated light at the focal point of the reflectors. In this manner the heat absorbing fluid flows through the heat absorbing layer from the input tube through the internal tubes and the focal points of at least some of the reflectors, and then exits as heated heat absorbing fluid at a higher temperature at output 80.

The sizing of the tubing used for the heat absorbing layer is selected to ensure that the heat absorbing fluid within the tubing can flow through the tubing as desired, throughout the entire solar heat collector. The tubing has to be large enough not to restrict flow, and the viscosity of the heat absorbing fluid is taken into account to insure that flow will be possible. Different methods may be used to cause the fluid to flow from one end of the solar heat collector to the other such as pressure differential at the input and output. For example, an appropriately sized pump may be used to effect the fluid flow. In another embodiment, gravity may be used to effect flow. In yet other embodiments, electrostatic or induction methods using charged or magnetized fluids may be used to effect flow, vibration may be used to effect flow, or thermal expansion using tubing constructed with 1-way valves may be used to effect flow. In addition, the weight of the heat absorbing fluid is taken into account if the solar heat collector will be used in a portable fashion, and the relative ability of the chosen fluid to absorb heat is also a factor when considering various heat absorbing fluids. Furthermore, the rate of flow may be chosen so that the fluid in the heat absorbing layer is heated a desired amount. For example, a slower flow rate may cause the fluid to heat to a higher temperature because a slower flow rate may result in the fluid spending more time at the focal points exposed to concentrated light. Factors such as the size of the tubing, the surface area of the towers, the number of light reflectors, the size and heating capacity of the light reflectors, the heat absorption capability of the particular fluid used, the expected heat loss of the system (e.g. because of a type of insulation used), the fluid temperature at the input, and the desired fluid output temperature are among many factors that may be considered when selecting a flow rate and the configuration of the solar heat collector.

The heated heat absorbing fluid may then be used to generated power. For example, in an embodiment, the heat absorbing fluid from the output tube 80 is used to generate steam which powers a turbine that drives an electric generator. In another embodiment, the heat absorbing fluid is water, and the heated water at the output tube 80 is used for a shower or for any purpose requiring heated water.

The solar heat collector of an embodiment of the invention may also have other layers not shown in FIG. 1. For example, the solar heat collector may include a base layer below the heat absorbing layer. The base layer may be separate from the heat absorbing layer, or it could be combined with that layer. The base layer may be made of an insulating material such as rubber or foam to help the heat absorbing layer retain heat, or alternatively the base layer could be made of a protective material to protect the tubing from rough surfaces that the solar heat collector might be place upon. Suitable materials for the base material such as rubber or foam may be selected to maintain the flexibility of the solar heat collector.

The solar heat collector may also include a protective layer (not shown) above the reflective layer. The protective layer may protect the reflective layer from dirt and/or damage, and could also include integral or added members to hold or support tubing above the reflective layer. This protective layer could be made from a translucent or transparent plastic or other suitable material that allows light to reach the reflective layer. The underside of the protective layer (i.e., the side facing the reflective layer) may be reflective to redirect any ancillary light back towards the reflectors.

The simple design of the solar heat collector allows it to be easily constructed by mating a heat absorbing layer to a reflective layer The simple design also allows the solar heat collector to be made in any scale, from very small scale collector sheets measuring an inch or less in thickness, to larger scale sheets measuring several inches in thickness. Small scale collector sheets may be lightweight and portable, and in an embodiment the collector sheets may be made from materials that allow the sheets to be flexible so that it can be rolled or even folded. Building the sheets from flexible material would also allow the collector sheets to be used in applications where a flat and rigid solar panel would be more difficult to install, such as around a utility pole.

Figure 2:
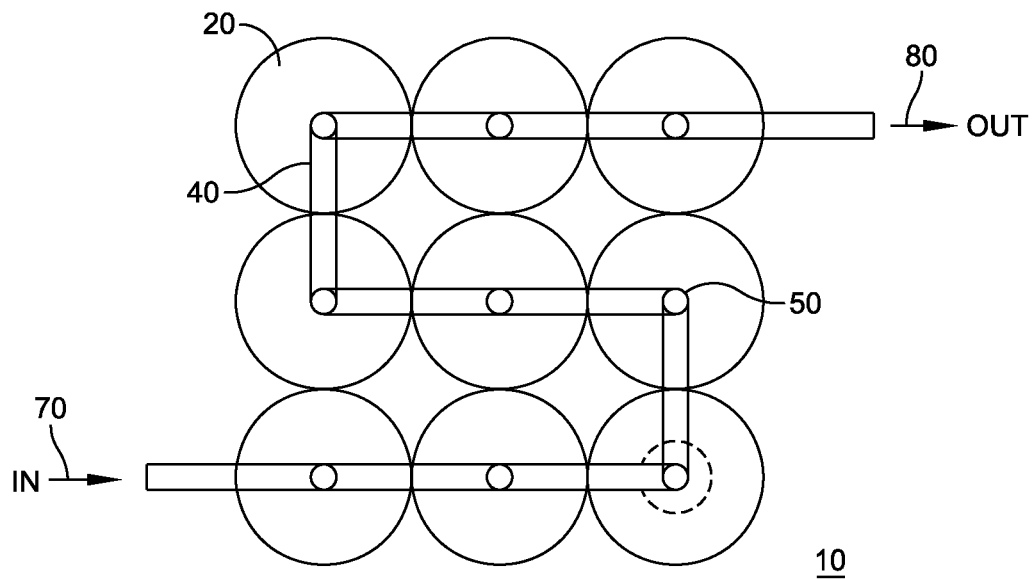
FIG. 2 is a partial plan view of a solar heat collector of an embodiment of the invention showing one embodiment of the heat absorbing fluid routing.

FIG. 2 is a partial plan view of a solar heat collector of an embodiment of the invention showing an exemplary routing of the heat absorbing fluid through tubing or passages 40 within the collector. The embodiment of FIG. 2 shows an embodiment of the tubing or passages 40 in which fluid enters though the input tube 70, then flows through the heat absorbing layer through tubes or passages 40, flows through towers 50 to the focal points of the reflectors, and then exits through output tube 80. The tubing configuration creates a continuous path for the heat absorbing fluid from the input to the output.

Figure 4:
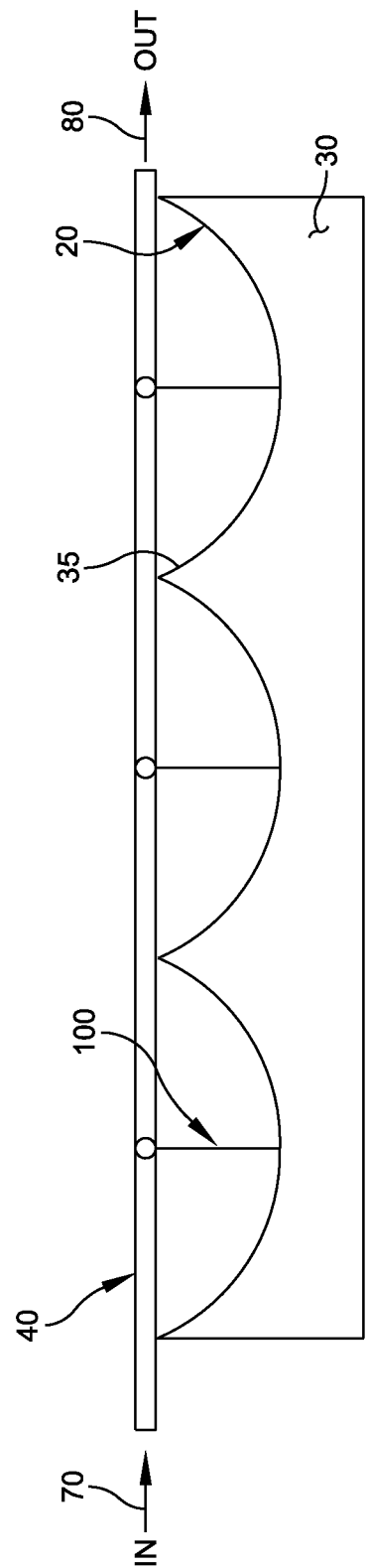
FIG. 4 is a cross-sectional elevation of a solar heat collector of an embodiment of the invention in which the heat absorbing layer is primarily above the reflective layer.

Notably, although FIG. 2 is intended to show the routing of heat absorbing fluid in an embodiment in which the heat absorbing layer is primary below the reflective layer (except for towers 50 rising from the center of the reflectors to the focal point), the routing configuration of FIG. 2 may also be used in a system in which the heat absorbing layer is primarily above the reflective layer, as shown in the embodiment of FIG. 4.

Figure 3:
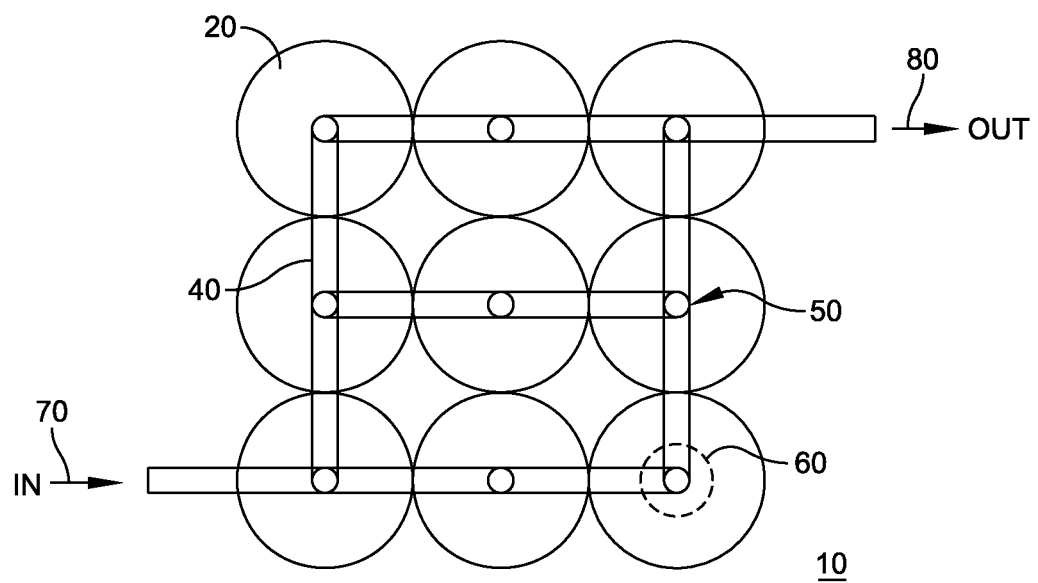
FIG. 3 is a partial plan view of a solar heat collector of an embodiment of the invention showing another embodiment of the heat absorbing fluid routing.

FIG. 3 shows a plan view of an alternative heat absorbing fluid routing. In this layout, tubes or passages 40 form parallel paths within the solar heat collector. Alternative layouts are possible as long as fluid flow is considered and appropriate means such as fluid differential or other means are used to insure that the fluid or gas flows from the input tube 70, through the focal points of at least some of the reflectors, and then through output tube 80. In other embodiments, multiple input tubes or output tubes could be used as long as flow of the heat absorbing fluid is maintained from the input(s) to the output(s).

FIG. 4 shows a partial elevation view of another embodiment of the invention in which the heat absorbing layer is primarily above the reflective layer. The heat absorbing layer is made up of tubing 40 that is above the solar reflectors 20 of the reflective layer 30. The tubing is set at a height such that a portion of the tubing is at the focal point of the reflectors. In an embodiment, the tubing is supported by vertical support members 100. The vertical support members may be members that are attached or integral to the reflective layer, in which case the individual solar reflectors may not need to have holes in their centers as in the embodiment of FIG. 1. In an alternative embodiment, the vertical support members may be members that are attached or integral to a base layer (not shown) below the reflective layer, with the support members 100 extending above the base layer through holes at the center of each reflector 20. In another alternative embodiment, the tubing rests upon (and is supported by) the ridges 35 of the reflective layer 30, in which case the vertical support members 100 may not be necessary.

In the solar heat collector embodiment of FIG. 4, the reflective layer 30 may be covered by a protective layer (not shown). In that embodiment, the tubing 40 of the heat absorbing layer may be suspended, attached, or otherwise supported by the protective layer. For example, the protective layer could have clips for holding tubing in place. FIG. 4 also shows input tube 70 and output tube 80, which are shown as also being above the reflective layer 30. In alternative embodiment, the input tube 70 and output tube 80 could be routed through the reflective layer.

Figure 5:
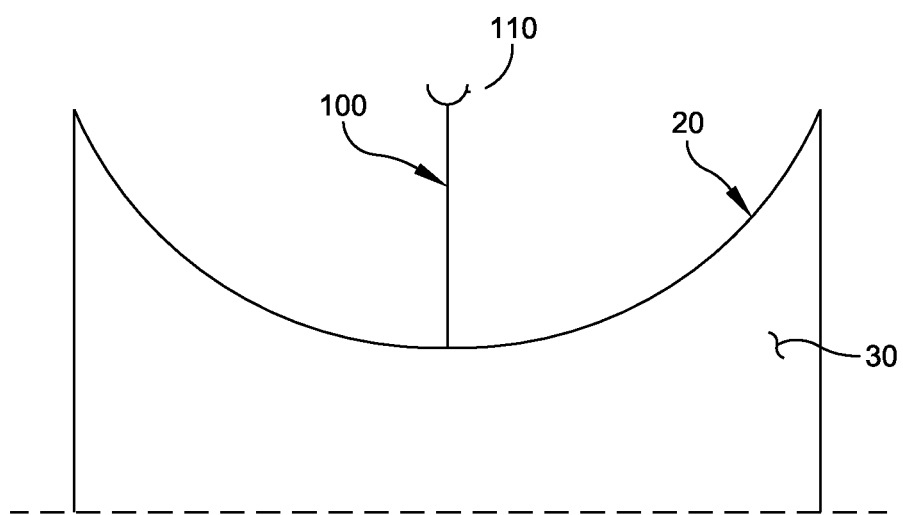
FIG. 5 is a cross-sectional elevation of a support for the heat absorbing layer above the reflective surface.

FIG. 5 is an elevation of a single reflector 20 having a support member 100 to support tubing above the reflective layer. The height of the support member 100 is configured so that tubing placed within a saddle portion 110 of the support member 100 is at the focal point of the reflector 20. The support member 100 may be constructed of any material with the strength to support the tubing and fluid or gas within the tubing, and in one embodiment may be a semi-rigid rubber material that is strong enough to support the tubing but also flexible to allow the solar heat collector to be rolled up or folded. The saddle portion 110 of the support member 100 is configured to hold the tubing in place.

In an embodiment, the entire solar heat collector is adapted from materials that can be easily cut in the field so the collector can be shaped or trimmed as desired. For example, the reflective layer may be constructed from a rubber material with integral parabolas formed into the rubber, with reflective paint or reflective mylar then adhered to the rubber material to create the reflective surface. Or the reflective layer could be formed with flexible Fresnel reflector sheets that are cuttable. Constructing the solar heat collector from easily cuttable (for example by knife or scissors) materials would make it possible to remove sections of the collectors as desired, for example if certain parts of the collector need to be removed to fit a particular application or if certain parts of the collector need to be removed because they are damaged. Functionality of the collector can be retained by patching any gaps in the tubing caused by the removal of section. The gaps can be patched with tubing patches and/or fittings as desired.

Figure 6:
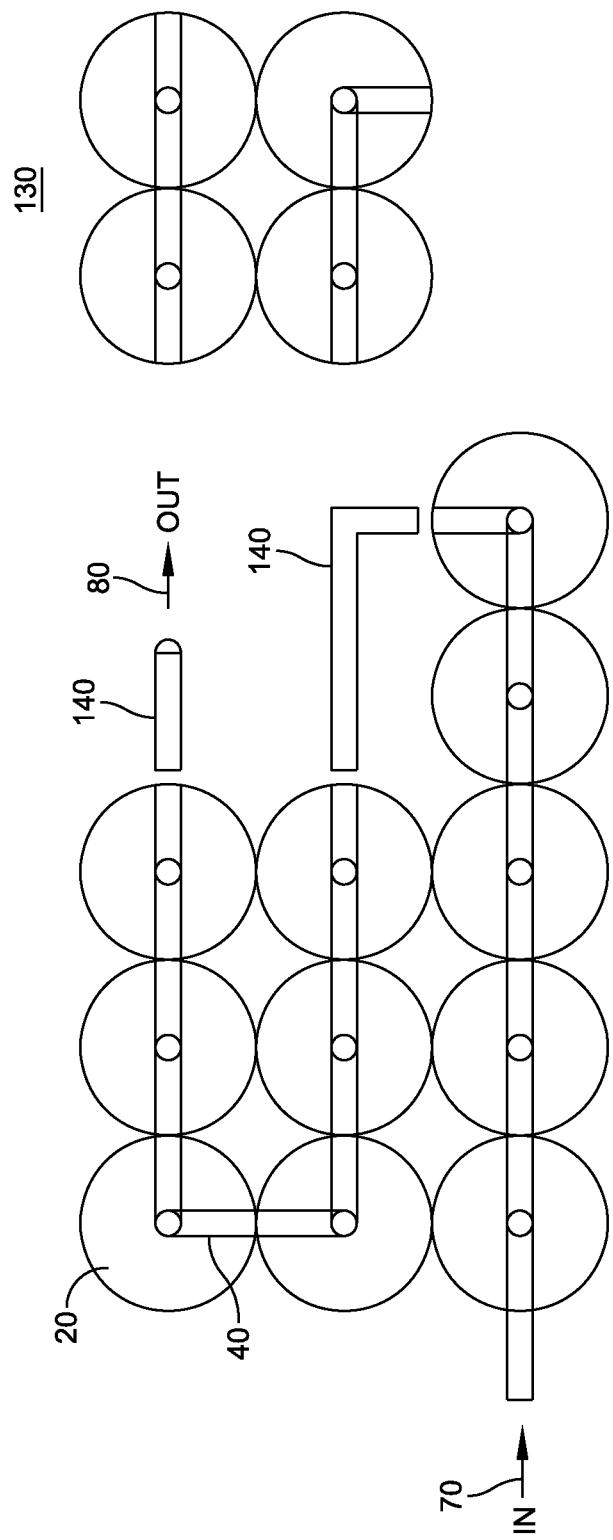
FIG. 6 is a plan view of a solar heat collector with a removed section and patch tubing to retain functionality of the solar heat collector.

For example, FIG. 6 shows an example of a solar heat collector 10 in which a section 130 of the collector has been removed. As shown, any gaps in the tubing may be patched with tubing patches 140, which maintains the continuous flow of the heat absorbing gas or fluid. Tubing patches may be joined to the remaining tubing through the use of appropriate fittings as is known in the art for the particular type of tubing being used and the type of heat absorbing fluid being used. In an exemplary embodiment, the tube routing for each solar heat collector is physically stenciled or otherwise shown on each solar heat collector itself, perhaps on the underside of the heat collector. Then, when patches or replacements are required, the fluid path is known so appropriate patches with tubing and/or fittings may be made.

Figure 7:
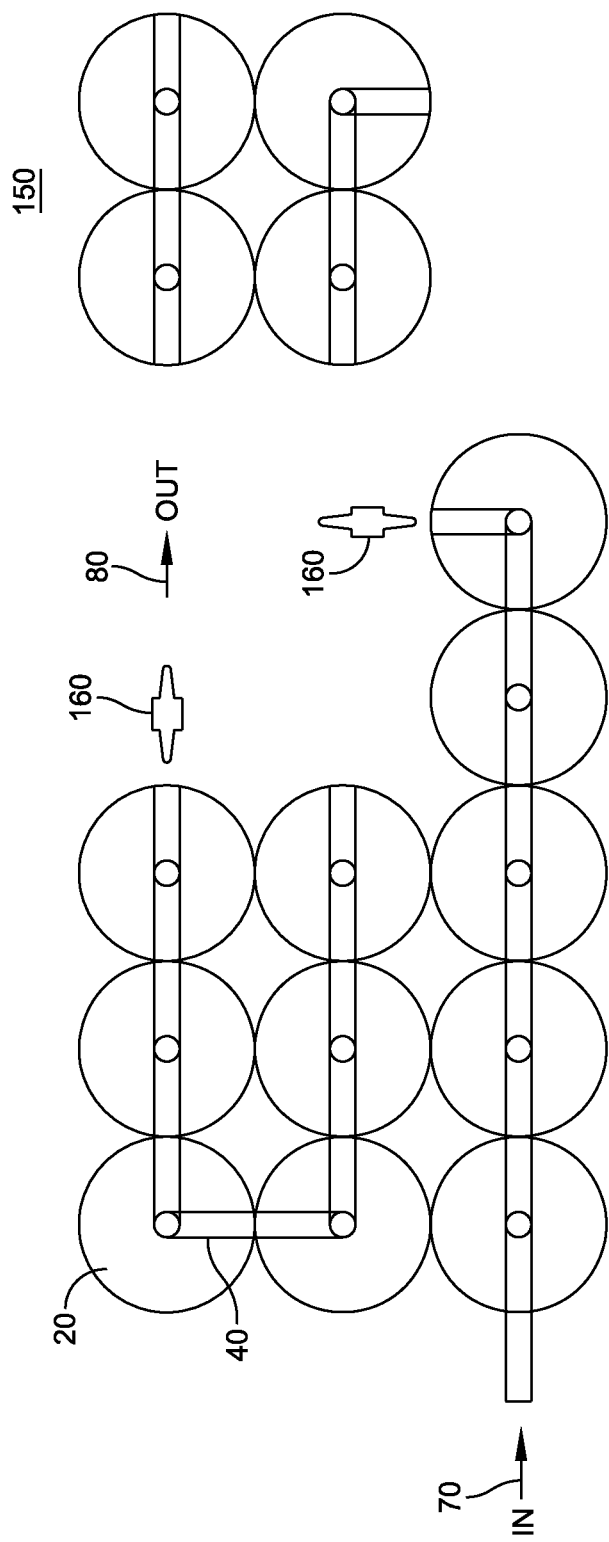
FIG. 7 is a plan view of a solar heat collector with a replacement section.

FIG. 7 shows an example of a solar heat collector in which a section of the collector is being replaced. In this embodiment, section 150 is a replacement section for a section that has been removed (not shown) because it has been damaged or is otherwise non-functional. In the case of a replacement section, appropriate tubing fittings 160 may be used that will allow section 150 to be snugly installed adjacent to the existing solar heat collector. The tubing fittings 160 allow the continuous path for the heat absorbing liquid or gas to be maintained, and also provide structural support so that the replacement section is structurally integrated to the original solar heat collector that is being repaired. Additional structural support such as tape, glue, or support pieces (not shown) may be used as desired depending on the size and location of the replacement section.

Figure 8:
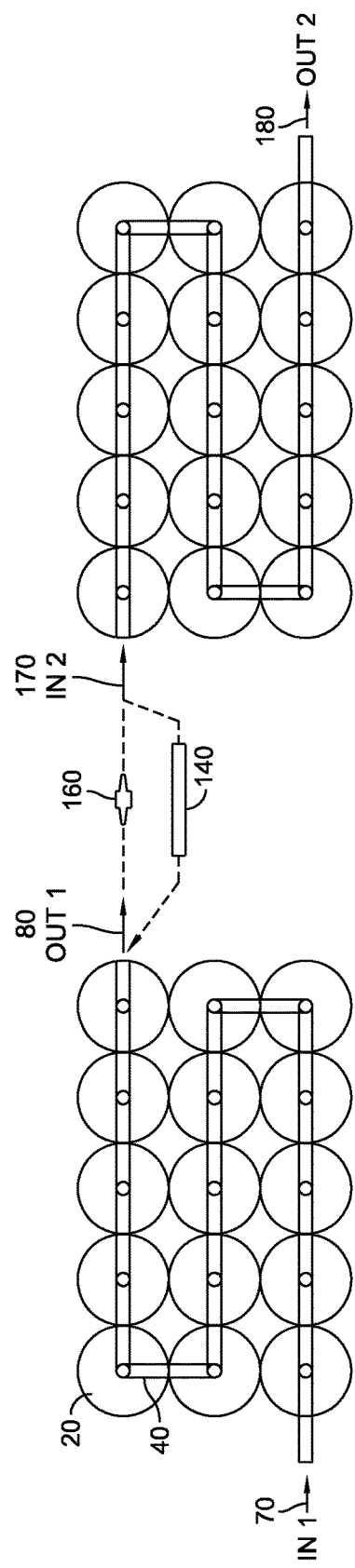
FIG. 8 is a plan view of a first solar heat collector and a second solar heat collector, and fitting and/or tubing to allow connection of the collectors.

Tubing patches and/or fittings may also be used to connect separate solar heat collectors to each other to create an array of solar heat collectors. In the embodiment shown in FIG. 8, the output tube 80 of a solar heat collector is connected to the input tube 170 of an adjacent solar heat collector to create an array of two heat collectors. The connection may be made using tubing or appropriate fittings as desired. For example, if it is desired that adjacent collectors sit against each other, fittings 160 may be used to join the input and output of the adjacent collectors. If it is not necessary for the collectors to sit butted against each other or if it is otherwise desirable for the collectors not to sit butted against each other, tubing 140 and fittings 160 may be used to connect the individual solar heat collectors to each other. In this way, any number of individual solar heat collectors may be attached together, subject to the limitation that the method (such as pressure differentiation) and device (such as a pump) used to move the fluid or gas within the tubes from the beginning input port 70 to the final output port (180 in this example) should be sufficient to maintain flow from the first to last solar heat collector in the array. Additional structural support such as tape, glue, or support pieces (not shown) may be used as desired depending on the size and location of the adjacent sections. Alternatively, a backing layer or substrate may be used to support the separate collectors. The portability of the solar heat collectors and their easy connectability permit arrays to be constructed as desired.

Figure 9:
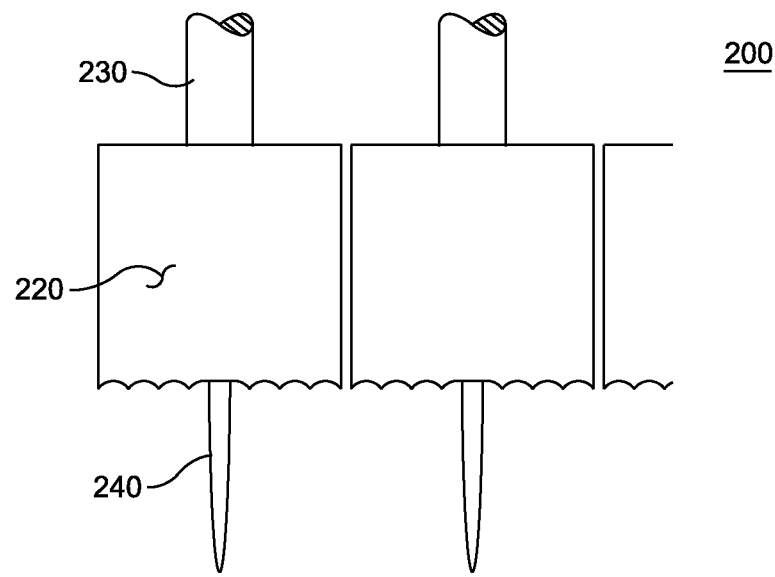
FIG. 9 is partial cross-sectional elevation of a bit array used to practice a method of an embodiment of the invention.
Figure 10:
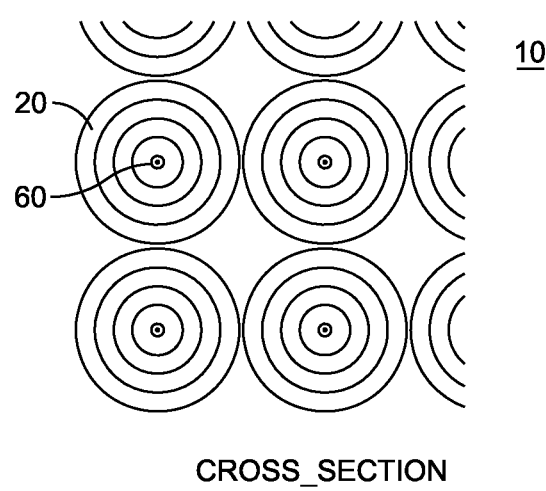
FIG. 10 is a partial plan view of a reflector sheet made with the bit array.

FIG. 9 is a partial elevation of a bit array 200 that may be used in a method for constructing a reflective layer from a sheet of reflective material. The bit array may have any number of elements, and may be sized to create an entire reflective layer sheet in a single grinding or to use smaller bit arrays that make several passes at different parts of the sheet to create the reflective layer. An individual bit 210 of the bit array 220 has a grinding portion 220 that grinds the reflective layer to create a reflector 20. The bit of FIG. 9 shows a grinding portion 210 that is used for grinding a Fresnel reflector; other types of bits may be used to grind parabolic, spherical, or other types of reflectors as is known in the art. Bit 210 also has a shaft 230 which is used by machinery to rotate the bit 210. Lastly, bit 210 has a hole drilling member 240, which creates a hole 60 in the center of each reflector 20 as shown in FIG. 10, which is a partial plan view of a reflective layer created by grinding the layer with a bit array 200. Hole drilling member 240 is only necessary when a hole is desired in the center of each reflector, such as if the hole is desired for a tower 50 or a support member 100 to support tubing. Stamping or casting of the reflector layer after grinding of the layer with a bit array 200 allows unused surface between reflectors to be impressed to provide additional reflective surface area 250 to each individual reflector element, as shown in the partial plan view of FIG. 11.

Figure 11:
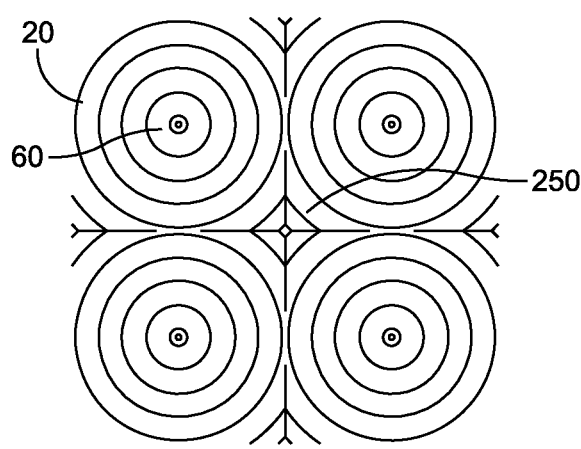
FIG. 11 is a partial plan view of a reflector sheet made by stamping or casting.

The bit array of FIG. 11 can be used with an embodiment of the solar hear collector that has the heat absorbing layer primarily above or below the reflective layer. In an embodiment in which the heat absorbing layer is primarily below (on the non-sun-facing side of the reflective layer) the reflective layer 30 such as shown in FIG. 1, the bit 210 has a hole drilling member 240, which creates a hole 60 in the center of each reflector 20. The heat absorbing layer has a first part that is adjacent to a non-sun-facing side of the reflective layer and a second part comprising towers extending from the first part of the heat absorbing layer though the hole 60 in the center of each reflector 20 to the focal point of at least some of the reflectors. The mating of the sheet of reflectors to the heat absorbing layer comprises inserting the towers 50 of the heat absorbing layer into the holes 60 in the center of the reflectors 20. In an embodiment in which the heat absorbing layer is primarily above the reflective layer 30 as exemplified in FIG. 4, the tubing may be supported on ridges 35 of the reflective layer 30 or using support members 100, such that a portion of the tubing passes through the focal point of at least some of the reflectors. Alternatively, the tubing may be supported by a protective cover (not shown) over the reflective layer.

The features of the solar heat collector have been disclosed, and further variations will be apparent to persons skilled in the art. All such variations are considered to be within the scope of the appended claims. Reference should be made to the appended claims, rather than the foregoing specification, as indicating the true scope of the disclosed method.

The features of FIGS. 1-11 are not exclusive. Other structures or methods may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention.

Furthermore, although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A solar heat collector comprising:
a continuous sheet of radially-symmetric solar reflectors, each of the solar reflectors having a focal point and configured such that each reflector redirects light impinging at any point along a surface of the reflector to the focal point; and
tubing routing heat absorbing fluid through the focal points of at least some of the solar reflectors in series along a continuous path and through the focal points of at least some of the solar reflectors in parallel, wherein the tubing has an input tube for receiving the heat absorbing fluid and an output tube for outputting heated heat absorbing fluid and
wherein the sheet is flexible such that it may be rolled or folded.

2. The solar heat collector of claim 1, wherein
the sheet of solar reflectors has a sun-facing side and a non-sun-facing side;
a first part of the tubing is adjacent to the non-sun-facing side of the sheet of solar reflectors, and
a second part of the tubing extends from the first part of the tubing through holes in the sheet of solar reflectors to the focal point of at least some of the solar reflectors.

3. The solar heat collector of claim 2, wherein the holes in the sheet of solar reflectors are centered on individual solar reflectors and wherein the second part of the tubing extends perpendicularly from the first part of the tubing through the holes in the solar reflectors to the focal point.

4. The solar heat collector of claim 3, wherein the first part of the tubing is embedded within a substrate.

5. The solar heat collector of claim 1, further comprising at least one support member arranged on at least one of the solar reflectors and configured to support parts of the tubing such that portions of the tubing pass through the focal point of least some of the solar reflectors.

6. The solar heat collector of claim 1, wherein the tubing is primarily located on a sun-facing side of the sheet of solar reflectors and wherein the tubing is supported so that portions of the tubing pass through the focal point of at least some of the solar reflectors.

7. A solar heat collector comprising:
a continuous reflective layer defining a plurality of radially-symmetric solar reflectors, each of the solar reflectors having a focal point and configured such that each reflector redirects light impinging at any point along a surface of the reflector to the focal point; and
a heat absorbing layer, a portion of said heat absorbing layer being situated at the focal point of at least some of the solar reflectors, wherein the heat absorbing layer comprises:
an input for receiving a heat absorbing fluid; passages for routing a heat absorbing fluid through the heat absorbing layer, through the focal points of at least some of the solar reflectors in series along a continuous path and through the focal points of at least some of the solar reflectors in parallel and an output for heated heat absorbing fluid
wherein the continuous reflective layer and heat absorbing layer together form a sheet and wherein the sheet is flexible such that it may be rolled or folded.

8. The solar heat collector of claim 7, wherein
a first part of the heat absorbing layer is adjacent to a non-sun-facing side of the reflective layer, and
a second part of the heat absorbing layer extends from the first part of the heat absorbing layer through at least one hole in the reflective layer to the focal point of at least some of the solar reflectors.

9. The solar heat collector of claim 7, wherein the input comprises an input tube, the passages comprise tubing, and the output comprises an output tube.

10. The solar heat collector of claim 9, wherein the tubing is embedded within a substrate.

11. The solar heat collector of claim 8, wherein the at least one hole in the reflective layer comprises a hole formed through a radial center of at least one of the solar reflectors, and wherein the second part of the heat absorbing layer extends perpendicularly from the first part of the heat absorbing layer through the at least one hole to the focal point of the at least one solar reflector.

12. The solar hear collector of claim 7, further comprising a protective layer adjacent to a sun-facing side of the reflective layer.

13. The solar heat collector of claim 11, wherein the second part of the heat absorbing layer comprises:
  a first fluid path extending perpendicularly from the first part of the heat absorbing layer through the at least one hole to the focal point of the at least one solar reflector; and
  a second fluid path extending perpendicularly with respect to the at least one solar reflector from the focal point through the at least one hole to the first part of the heat absorbing layer.

14. The solar heat collector of claim 1, wherein each of the solar reflectors comprises a sun-facing side and a non-sun-facing side, wherein the sun-facing side is configured to redirect light impinging at any point along a surface of the reflector to the focal point.

15. The solar heat collector of claim 14, wherein each of the solar reflectors comprises a hole formed through a radial center thereof, and wherein the tubing extends perpendicularly from the non-sun-facing side through the hole to the focal point of the solar reflector.

16. The solar heat collector of claim 15, wherein the tubing comprises:
  a first fluid path extending perpendicularly from the non-sun-facing side of the solar reflector through the hole to the focal point of the solar reflector; and
  a second fluid path extending perpendicularly with respect to the solar reflector from the focal point through the hole to the non-sun-facing side of the solar reflector.

17. A solar heat collector comprising:
  a continuous reflective sheet having a plurality of radially-symmetric solar reflectors defined therein, each of the solar reflectors having a hole formed through a radial center thereof and a focal point configured such that each of the reflectors redirects light impinging at any point along a surface of the reflector to the focal point, wherein the sheet is flexible such that it may be rolled or folded; and
  tubing routing heat absorbing fluid through the focal points of the solar reflectors in series along a continuous path, the tubing comprising:
  an input tube for receiving the heat absorbing fluid; an output tube for outputting heated heat absorbing fluid;
  a first fluid path extending perpendicularly from the non-sun-facing side of the solar reflector through the hole to the focal point of the solar reflector; and
  a second fluid path extending perpendicularly with respect to the solar reflector from the focal point through the hole to the non-sun-facing side of the solar reflector.

18. The solar hear collector of claim 17, wherein the tubing routes heat absorbing fluid through the focal points of at least some of the solar reflectors in parallel.

* * * * *